Nov. 25, 1958

C. E. JOHNSON 2,861,686

POTATO HARVESTER ATTACHMENT FOR REMOVING
SOD, STICKS, STONES, ETC

Filed Dec. 6, 1954

INVENTOR.
Carl E. Johnson
BY
Atty.

Nov. 25, 1958

C. E. JOHNSON 2,861,686

POTATO HARVESTER ATTACHMENT FOR REMOVING
SOD, STICKS, STONES, ETC

Filed Dec. 6, 1954

INVENTOR.
Carl E. Johnson
BY
Atty.

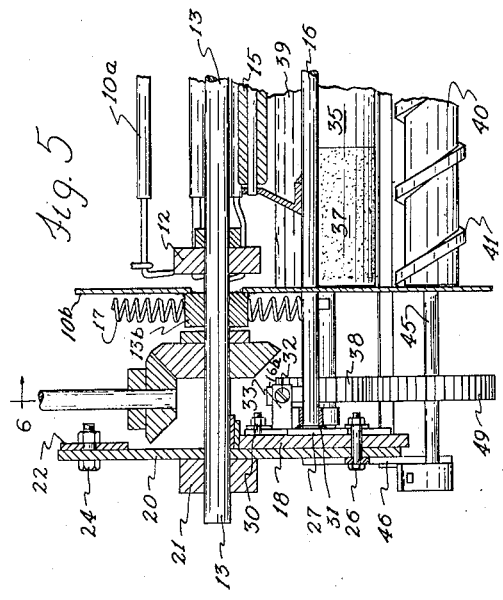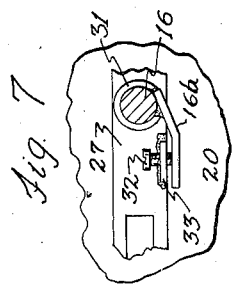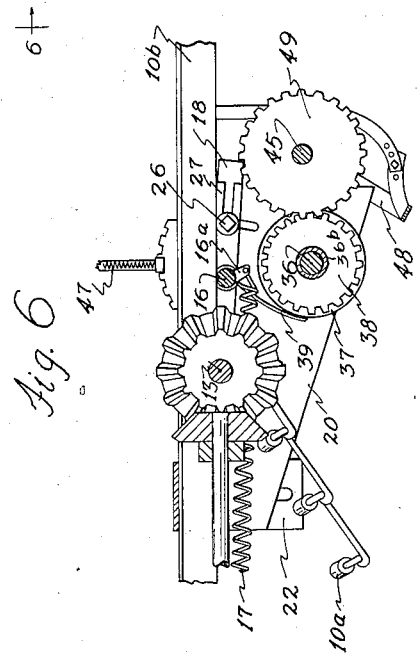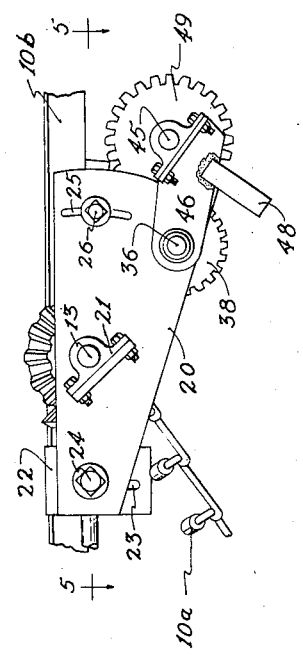

Nov. 25, 1958 C. E. JOHNSON 2,861,686
POTATO HARVESTER ATTACHMENT FOR REMOVING
SOD, STICKS, STONES, ETC
Filed Dec. 6, 1954 5 Sheets-Sheet 4

INVENTOR.
Carl E. Johnson
BY
Struhl Wells
Atty.

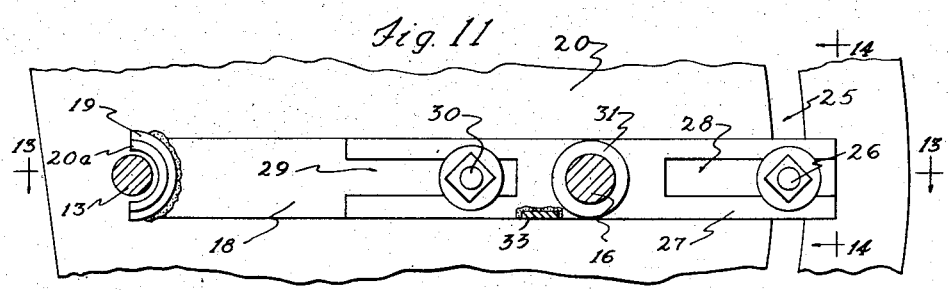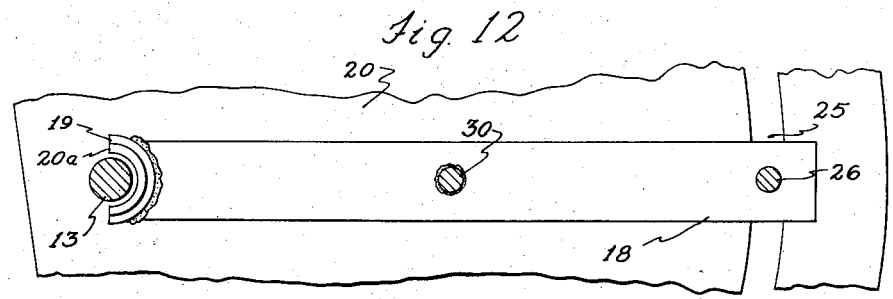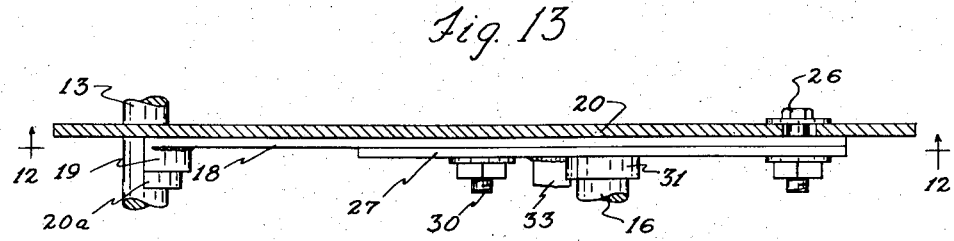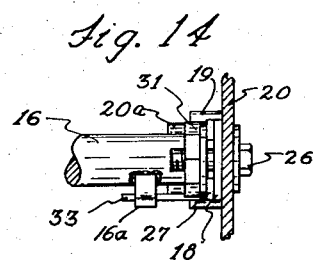

United States Patent Office 2,861,686
Patented Nov. 25, 1958

2,861,686

POTATO HARVESTER ATTACHMENT FOR REMOVING SOD, STICKS, STONES, ETC.

Carl E. Johnson, Blackfoot, Idaho

Application December 6, 1954, Serial No. 473,122

9 Claims. (Cl. 209—106)

This invention relates to a potato harvester attachment for removing sods, sticks, stones, etc.

In the harvesting of potatoes, it is customary to dig the potatoes with a digger point which elevates the soil and potatoes together onto an elevating conveyor which may deliver the potatoes to other conveyors that in turn carry the potatoes to a suitable receptacle or loading device. Vine removers are commonly employed to pick off the potato vines and large weeds that are carried up with the potatoes. Most of the soil drops through the conveyors which are of the open cross rod construction. There are, however, sod fragments, short pieces of vines, sticks, clods and rocks, which will not be separated from the potatoes. It is the principal purpose of this invention to provide an attachment which can be applied to the discharge end of a conveyor for removing the objectionable articles mentioned above. My invention is particularly applicable to a conveyor of the type having cross rods with intermediate portions of the cross rods offset inwardly so as to slow down the speed of the potatoes, etc., thereon at the point where they leave the conveyor. It is, however, not limited to this type of conveyor as will be evident from the detailed description found hereinafter.

More specifically it is the purpose of my invention to provide an attachment for potato harvesters to be applied at the discharge end of a conveyor, which embodies a trash intercepting roller positioned adjacent to the down turning portion of the conveyor so that the potatoes and other relatively large round objects will roll over it, the roller being free to turn in a direction to aid in carrying down such trash as sticks, grass particles, sod and the like, that drop between the end of the conveyor and the roller, the roller also being yieldably mounted to move away from the conveyor to accommodate relatively thick pieces of sod, etc. that are sometimes carried with the potatoes.

It is another purpose of my invention to provide in combination with the roller attachment just described, a separating and cleaning mechanism to which the potatoes pass after they go over the roller, which comprises a smooth roller having a relatively hard surface and a soft surfaced spiral ribbed roller, both turning in a direction to advance the articles falling thereon away from the conveyor, together with an end roller axially aligned with the smooth roller but turning in the opposite direction for lifting and removing stones, small potatoes, etc., which are advanced endwise to it by the ribbed roller.

It is a further purpose of my invention to provide in combination with the trash intercepting roller and the conveyor, a novel means for lifting articles that stick between the links of the conveyor as they approach the spring pressed roller so that they will be removed from the conveyor before it passes the trash intercepting roller.

Other objects and advantages of my invention will appear from the following description and the accompanying drawings wherein a preferred form of the invention is illustrated. It should be understood, however, that the drawings and description are illustrative only and are not intended to limit the invention except insofar as it is limited by the claims.

In the drawings:

Figure 4 is a fragmentary side view looking at Figure 1 from the line 4—4 on Figure 1;

Figure 5 is a sectional view taken on the line 5—5 of Figure 4;

Figure 6 is a sectional view taken on the line 6—6 of Figure 5;

Figure 7 is an enlarged fragmentary sectional view taken on the line 7—7 of Figure 1;

Figure 11 is an enlarged fragmentary sectional view taken on the line 11—11 of Figure 1;

Figure 12 is a sectional view taken on the line 12—12 of Figure 13;

Figure 13 is a sectional view taken on the line 13—13 of Figure 11; and

Figure 14 is a fragmentary sectional view taken on the line 14—14 of Figure 11.

Figure 1:
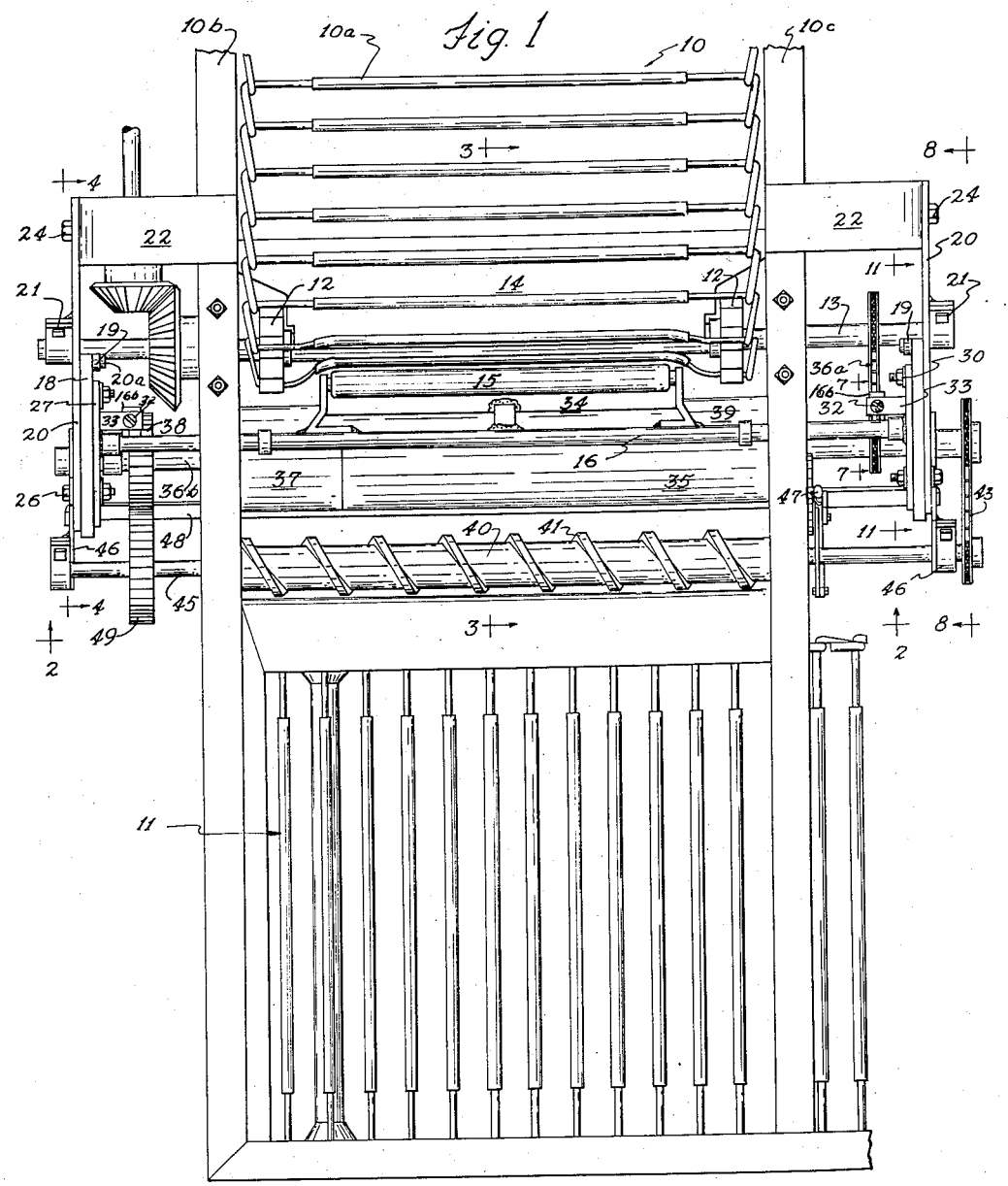
Figure 1 is a plan view of a portion of a potato harvester embodying my invention.
Figure 2:
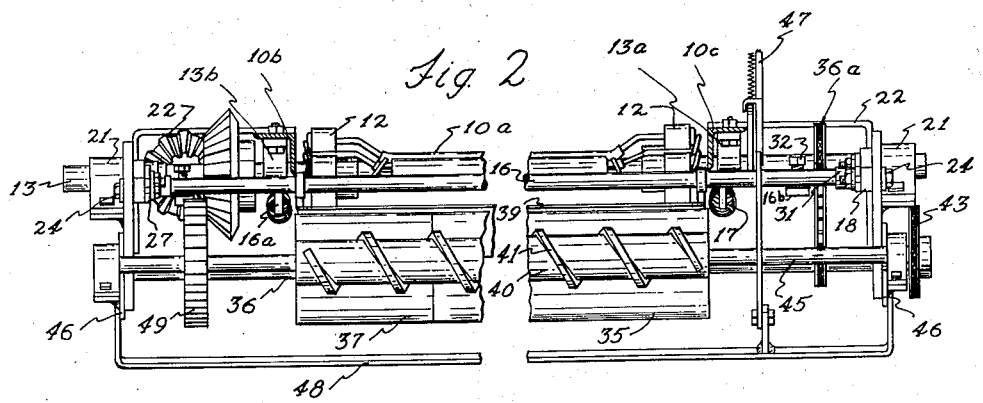
Figure 2 is a sectional view taken on the line 2—2 of Figure 1.
Figure 3:
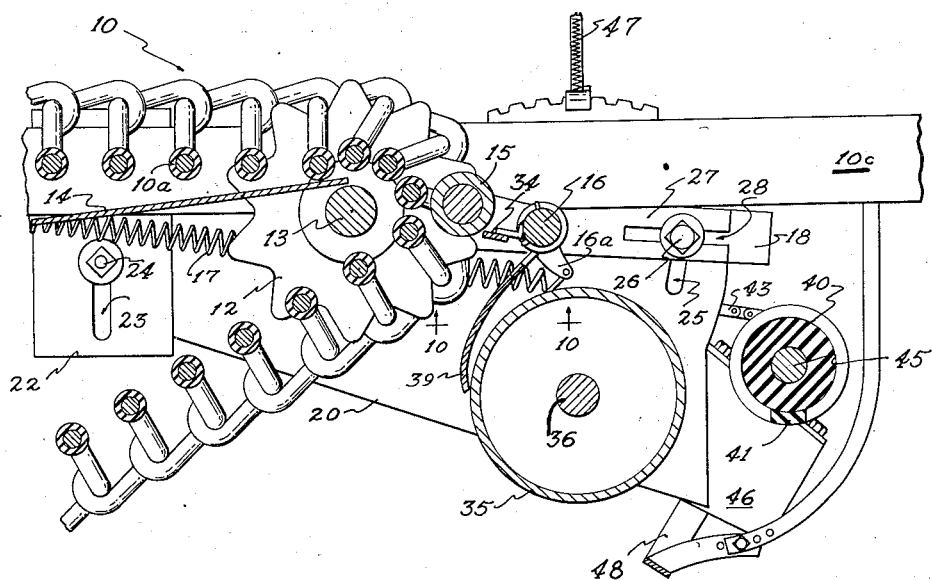
Figure 3 is an enlarged sectional view taken on the line 3—3 of Figure 1.
Figure 8:
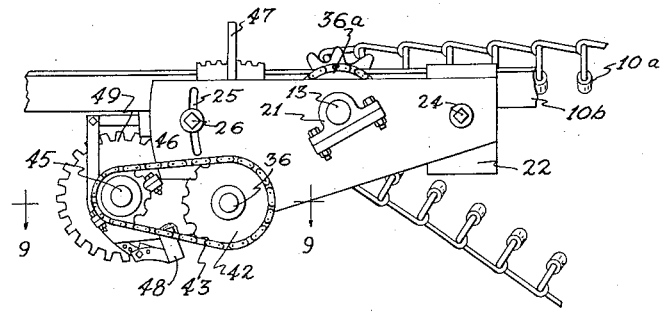
Figure 8 is a fragmentary side view looking at Figure 1 from the line 8—8 of Figure 1.
Figure 9:
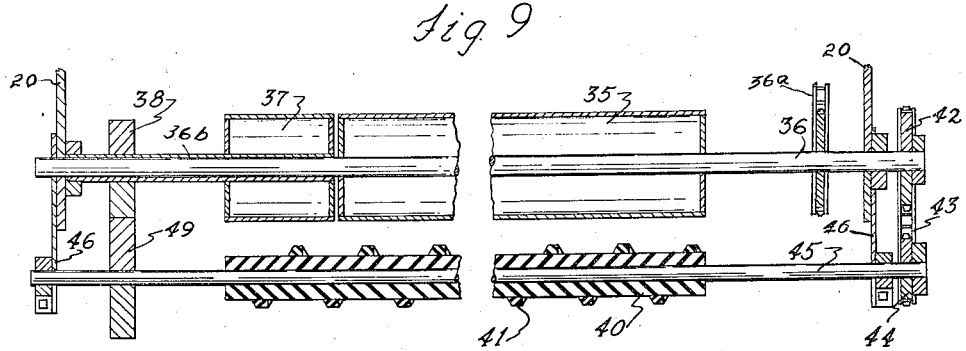
Figure 9 is a sectional view taken on the line 9—9 of Figure 8.
Figure 10:
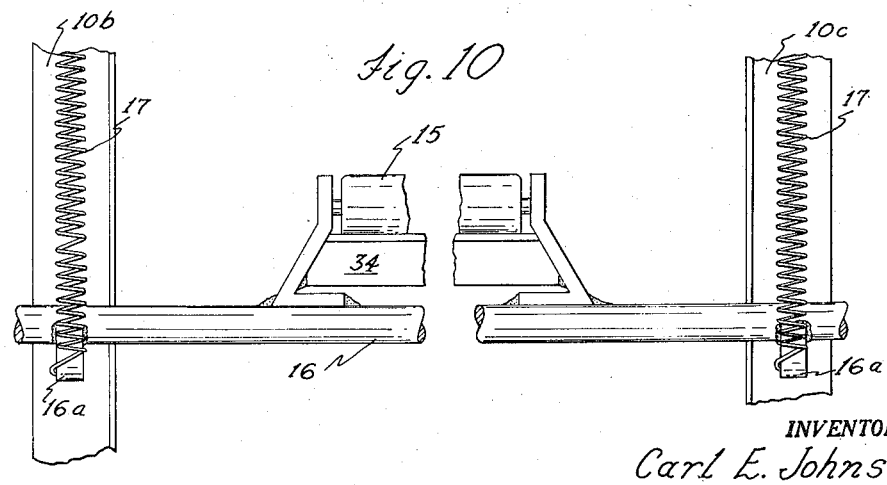
Figure 10 is an enlarged fragmentary bottom view looking up from the line 10—10 on Figure 3, with certain parts broken away to illustrate the springs for the trash intercepting roller and the scraper that cleans it.

Referring now to the drawings, my invention is shown as applied to a potato harvester wherein the conveyor 10 is utilized to advance the potatoes to another conveyor 11, or some other suitable receiving device. The conveyor 10 may be an elevating conveyor, a cross conveyor which receives the potatoes from an elevating conveyor, or a transfer conveyor. The particular type of conveyor shown is like that shown and claimed in my co-pending application, Ser. No. 473,121, filed December 6, 1954, now Patent No. 2,759,930. A conveyor of this type has cross rods 10a which are offset between the side edges thereof inwardly toward the inside of the conveyor so as to form a trough and to slow down the delivery of the potatoes thereon at the point where they leave the conveyor. The conveyor 10 is driven by sprocket wheels 12 on a drive shaft 13. The sprocket wheels 12 are kept to as small a diameter as practicable. Directly over the shaft 13, I provide a plate 14 which extends from the shaft beneath the upper flight of the conveyor for a short distance and which slopes downwardly from the shaft to its free end. This plates serves as a means to push sticks, stones, potatoes and the like, that stick down between the cross rods of the conveyor, upwardly as they approach the shaft so as to keep them from wedging in the conveyor and to keep them from winding about the shaft itself.

Directly behind the conveyor 10, and preferably at close proximity to the offset portions of the cross rods of the conveyor, I mount for free rotation a small roller 15. This roller 15 is carried by a pivoted cross rod 16 and is yieldingly pressed upwardly by connecting two arms 16a on the rod 16 to two springs 17. The mounting of the rod 16 is of such a nature that the rod 16 and the roller 15 may be swung up and down about the shaft 13 as a pivot point to obtain the right level and the rod 16 and the roller 15 may be adjusted toward and away from the conveyor 10 to obtain the most effective spacing of the roller 15 from the conveyor 10. This mounting comprises two bars 18 at the opposite ends of the rod 16. These bars 18 are pivoted about the axis of the shaft 13 by a semicircular bearing portion 19 on each bar and a cooperating semicircular member 20a on each auxiliary side frame 20. The side frames 20 mount bearings 21 to pivot the frames 20 on the shaft 13. The shaft 13 is carried by bearings 13a and 13b on the frame members 10b and 10c of the conveyor 10. The side frames 20 are held in adjusted position by brackets 22 that are fixed on the members 10b and 10c. The brackets 22 have slots 23 to receive bolts 24 to hold the frames 20. A slot 25 is provided in each side frame 20. The slot 25 is curved about the shaft 13 as an axis. A bolt 26 secures the bar 18 in adjusted position. A second bar 27 has endwise running slots 28 and 29 at the ends thereof. The slot 28 receives the bolt 26 and the slot 29 receives a bolt 30 that is welded to the bar 18. The cross rod 16 that carries the roller 15 is pivoted in a bearing 31 that is provided on the bar 27. A set screw 32 is provided on an ear 33 that is welded on the bar 27. This set screw 32 provides a stop engaging a bar 16b on the rod 16 to limit the swinging of the roller 15 upwardly. The springs 17 are connected to the arms 16a on the rod 16 and extended forwardly to where they are anchored on the side frame members 10b and 10c. The cross rod 16 also carries a scraper 34 which is pressed against the roller 15 to keep this roller clean at all times.

The side frames 20 carry a roller 35 which is a hollow metal tube that extends most of the way across the space from the frame member 10c to the member 10b. The roller 35 is secured on a shaft 36 that extends outwardly at the right hand side as the machine is viewed looking toward the conveyor 10 across the roller 35. The shaft 36 is driven from the shaft 13 by a chain drive 36a. At the left hand end of the roller 35 there is a separate short roller 37 which is journalled on the shaft 36 and which has a roughened exterior surface. A sleeve 36b rotatable on the shaft 36 carries a gear 38 which is fixed to the roller 37 and serves to drive it in the opposite direction to the direction of rotation of the roller 35. The roller 35 receives the potatoes passing over the roller 15 and turns in a direction to advance them while the roller 37, which is quite short, turns in the opposite direction. A shield 39 is suspended from the rod 16 in position to keep trash away from the rollers 35 and 37.

Below and to the rear of the rollers 35 and 37 there is a soft surfaced roller 40 which is provided with a helical rib 41. This roller 40 is driven from the shaft 36 by a sprocket wheel 42 on the shaft 36, a chain 43 and a sprocket wheel 44 on the shaft 45 of the roller 40. The helical rib 41 is so wound that when the roller 40 is turning in the same direction as the roller 35, the rib will advance material endwise along the rollers 35 and 40 to the roller 37. The roller 35 is usually but not always, driven at about 19% to 40% higher surface speed than the roller 40. The roller 40 being soft surfaced, and aided by the spiral, tends to rebound the potatoes and carry them over to a discharge point beyond the roller 40. Most stones, small potatoes and clods, however, are lodged in the space or trough between the rollers 35 and 40 and worked endwise by the rib 41 to engagement with the roller 37. The roller 40 is mounted on arms 46 which are pivoted on the shaft 36 for adjustment up and down about the axis of the shaft 36. A hand lever 47, that is mounted on one side frame 20, is connected to a cross bar 48 which connects the arms 46. The hand lever 47 is used to adjust the roller 40 properly to cause it to release the potatoes of adequate size and to carry the clods, rocks and small potatoes, over the roller 37. The roller 37 is connected by the gear 38 to another gear 49 on the end of the roller 40 so as to be driven at the proper speed. In practice it is found that with the roller 40 at the proper level, this combination functions first to discharge larger potatoes directly over the roller 40 from the roller 35, secondly to carry small potatoes and rocks that may reach this point to the space between the rollers 37 and 40. In this space the resilient potatoes are lifted by the roughened roller 37 and thrown over the roller 40 to be collected and saved, while the rocks or hard clods having no resiliency, continue to move endwise past the ends of the rollers, to be discharged onto the ground.

The roller 15 and the rod 16 are applicable to conditions where the necessity for rollers 35, 37, and 40 does not exist. At any point in a conveyor system for handling dug potatoes, this assembly may be inserted at the discharge end of a conveyor where it will perform the functions of accepting sticks and pieces of sod or grass, and discharging them downwardly while permitting the potatoes and the like to go over it without interruption. The particular construction and operation of the roller 15 and its mounting rod 16 are not limited to use with offset conveyors. The offset conveyor, however, combines with the roller 15 to produce a much more efficient action in the removal of sticks, sod and the like, because the offset portions of the cross rods in the conveyor move closer together at the point of discharge, and furthermore, slow down the movement of the clinging type of trash that has to be removed so as to facilitate entry of the trash between the cross rods of the conveyor and the roller 15.

The attachment as a whole comprises the extended ends of the shaft 13 providing pivot means on the discharge end of the conveyor on which two side frames 20 are mounted. The members 22 and 24 comprise means for adjusting the side frames 20 about the ends of the shaft 13. The transverse, freely rotatable roller 15 is held in position in close horizontal proximity to the discharge end of the conveyor by the yieldable and adjustable mounting means which comprises the rod 16, the bars 18 and 27, and the springs 17, so that the roller can intercept small sticks, sod, etc. discharged from the conveyor. The side frames 20 also mount the sorting and cleaning roller assembly composed of the smooth surfaced roller 35, the spiral ribbed roller 40 and the rough surfaced roller 37. The roller 37 is coaxial with the roller 35 and the roller 40 is supported in spaced parallel relation to the rollers 35 and 37 so as to cooperate with both of them in moving objects endwise. The rollers 35 and 37 are rotated in opposite direction on their common axis, and the roller 40 is rotated in the same direction as the roller 35, by the drive means comprising the chain drive 36a from the shaft 13 to the shaft 36, on which the roller 35 is fixed, the chain drive 43 from the shaft 36 to the shaft 45 on which the roller 40 is fixed, and the gear connection from shaft 45 to the sleeve 36b by means of the gears 38 and 49 fixed to the sleeve 36b and the shaft 45 respectively. The roller 40 is manually adjustable about the axis of the rollers 35 and 37 by means of the arms 46 that carry the shaft 45 and the handlever 47 and the cross bar 48 that connects the arms 46. When the side frames 20, the bars 18 and 27, and the arms 46 are secured in any given position, they comprise, together with the frame members 10b and 10c, a framework which supports the shaft 16 and the rollers 35, 37 and 40 in fixed relation to each other.

From the brief analysis in the foregoing paragraph it is believed to be clear that the several rollers 15, 35, 37 and 40 are so positioned and mounted with respect to the discharge end of the conveyor 10, as to receive the potatoes, etc., from the conveyor, separate the trash, stones, clods, etc., from the potatoes and do so in such a manner as to avoid bruising and damage to the select, larger size potatoes. The adjustments provided in the mountings of the rollers are adequate to adopt the machine to the various field conditions and to the size of potatoes to be passed directly over the roller 40.

It is believed that the nature and advantages of my invention will be clear from the foregoing description.

Having thus described my invention, I claim:

1. In a potato harvester, the combination with an endless conveyor composed of a multiplicity of cross rods linked together at their ends on which the potatoes are carried, of a sloping plate between the upper and lower flights of said conveyor at its discharge end, said plate having its topmost edge substantially in contact with the rods of the top flight at said discharge end and receding from the rods of the top flight as it extends away from said discharge end whereby to lift sticks, small potatoes etc. between said rods as they approach the discharge end, a freely rotatable transverse roller positioned in proximity to the downwardly moving rods at the discharge end of the conveyor, a smooth surfaced transverse roller below and rearwardly of said first named roller, a roller having a spiral rib thereon and spaced rearwardly from and parallel to the smooth surfaced roller, drive means for said two last named rollers operable to move their adjacent surfaces in opposite directions, the spiral ribbed roller having a portion projecting endwise beyond the end of said smooth surfaced roller toward which the ribbed roller tends to move objects carried by and between said two last named rollers, and a rough surfaced roller axially aligned with, and of the same diameter as the smooth surfaced roller, extending from the said end of the smooth surfaced roller parallel to the projecting portion of the spiral ribbed roller, and means to rotate the rough surfaced roller in a direction opposite to the direction of rotation of the smooth surfaced roller.

2. In a potato harvester, the combination with an endless conveyor composed of a multiplicity of cross rods linked together at their ends on which the potatoes are carried, of a sloping plate between the upper and lower flights of said conveyor at its discharge end, said plate having its topmost edge substantially in contact with the rods of the top flight at said discharge end and receding from the rods of the top flight as it extends away from said discharge end whereby to lift sticks, small potatoes, etc. between said rods as they approach the discharge end, a freely rotatable transverse roller positioned in proximity to the downwardly moving rods at the discharge end of the conveyor, a smooth surfaced transverse roller below and rearwardly of said first named roller, a roller having a spiral rib thereon and spaced rearwardly from and parallel to the smooth surfaced roller, drive means for said two last named rollers operable to move their adjacent surfaces in opposite directions, the spiral ribbed roller having a portion projecting endwise beyond the end of said smooth surfaced roller toward which the ribbed roller tends to move objects carried by and between said two last named rollers, and a rough surfaced roller axially aligned with, and of the same diameter as the smooth surfaced roller, extending from the said end of the smooth surfaced roller parallel to the projecting portion of the spiral ribbed roller, a framework attached to the conveyor in which said rollers are mounted, said framework including movable arms carrying the spiral ribbed roller, means connected to said movable arms and to the framework operable to move the spiral ribbed roller up and down, and means to rotate the rough surfaced roller in a direction opposite to the direction of rotation of the smooth surfaced roller.

3. In a potato harvester, the combination with an endless conveyor composed of a multiplicity of cross rods linked together at their ends on which the potatoes are carried, of a sloping plate between the upper and lower flights of said conveyor at its discharge end, said plate having its topmost edge substantially in contact with the rods of the top flight at said discharge end and receding from the rods of the top flight as it extends away from said discharge end whereby to lift sticks, small potatoes, etc. between said rods as they approach the discharge end, a freely rotatable transverse roller positioned in proximity to the downwardly moving rods at the discharge end of the conveyor, mounting means for said roller, yieldably supporting it for movement away from the rods to pass sod, etc., that fall between the roller and the rods, a smooth surfaced transverse roller below and rearwardly of said first named roller, a roller having a spiral rib thereon and spaced rearwardly from and parallel to the smooth surfaced roller, drive means for said two last named rollers operable to move their adjacent surfaces in opposite directions, the spiral ribbed roller having a portion projecting endwise beyond the end of said smooth surfaced roller toward which the ribbed roller tends to move objects carried by and between said two last named rollers, and a rough surfaced roller axially aligned with, and of the same diameter as the smooth surfaced roller, extending from the said end of the smooth surfaced roller parallel to the projecting portion of the spiral ribbed roller, and means to rotate the rough surfaced roller in a direction opposite to the direction of rotation of the smooth surfaced roller.

4. In a potato harvester, the combination with an endless conveyor composed of a multiplicity of cross rods linked together at their ends on which the potatoes are carried, of a freely rotatable transverse roller positioned in proximity to the downwardly moving rods at the discharge end of the conveyor, a smooth surfaced transverse roller below and rearwardly of said first named roller, a roller having a spiral rib thereon and spaced rearwardly from and parallel to the smooth surfaced roller, drive means for said two last named rollers operable to move their adjacent surfaces in opposite directions, the spiral ribbed roller having a portion projecting endwise beyond the end of said smooth surfaced roller toward which the ribbed roller tends to move objects carried by and between said two last named rollers, and a rough surfaced roller axially aligned with, and of the same diameter as the smooth surfaced roller, extending from the said end of the smooth surfaced roller parallel to the projecting portion of the spiral ribbed roller, and means to rotate the rough surfaced roller in a direction opposite to the direction of rotation of the smooth surfaced roller.

5. A cleaning and sorting attachment adapted to separate trash from potatoes as they pass off the discharge end of a conveyor, said attachment comprising pivot means on the conveyor at its discharge end, side frames carried on the pivot means, means on the conveyor and connected to the side frames to adjust the side frames up and down about the pivot means, a trash intercepting roller positioned horizontally adjacent to the discharge end of the conveyor, means on said side frames yieldably supporting said roller for movement away from the conveyor, a sorting and cleaning roller assembly carried by said side frames below and rearwardly from the first named roller, said assembly comprising a long smooth surfaced roller and a short rough surfaced roller at one end of and coaxial with said smooth surfaced roller, a spiral ribbed roller spaced rearwardly from the two last named rollers, drive means on a side frame to rotate the smooth surfaced roller and the spiral ribbed roller in a direction to move their top surfaces away from the conveyor, said spiral ribbed roller having its spiral rib arranged to feed articles lodging between it and the smooth surfaced roller toward the rough surfaced roller, and means connecting the spiral ribbed roller and the rough surfaced roller, operable to rotate the rough surfaced roller in a direction opposite to the direction of rotation of the spiral ribbed roller.

6. A cleaning and sorting attachment adapted to separate trash from potatoes as they pass off the discharge end of a conveyor, said attachment comprising pivot means on the conveyor at its discharge end, side frames carried on the pivot means, means on the conveyor and connected to the side frames to adjust the side frames up and down about the pivot means, a sorting and cleaning roller assembly carried by said side frames below and rearwardly from the discharge end of the conveyor, said assembly comprising a long smooth surfaced roller and a short rough surfaced roller at one end of and coaxial with said smooth surfaced roller, a spiral ribbed roller spaced rearwardly from the two last named rollers, drive means on a side frame to rotate the smooth surfaced roller and the spiral ribbed roller in a direction to move their top surfaces away from the conveyor, said spiral ribbed roller having its spiral rib arranged to feed articles lodging between it and the smooth surfaced roller toward the rough surfaced roller, and means connecting the spiral ribbed roller and the rough surfaced roller, operable to rotate the rough surfaced roller in a direction opposite to the direction of rotation of the spiral ribbed roller.

7. A cleaning and sorting attachment adapted to separate trash from potatoes as they pass off the discharge end of a conveyor, said attachment comprising pivot means on the conveyor at its discharge end, side frames carried on the pivot means, means on the conveyor and connected to the side frames to adjust the side frames up and down about the pivot means, a trash intercepting roller positioned horizontally adjacent to the discharge end of the conveyor, means on said side frames yieldably supporting said roller for movement away from the conveyor, and a cleaning scraper beneath said roller.

8. An attachment for endless potato conveyors of the type adapted for use in a potato harvester which attachment comprises a freely rotatable trash intercepting roller positioned at the discharge end of said conveyor in proximity to the down turning portion of the conveyor, at substantially the level of said portion so that potatoes and other similarly shaped objects will roll over it as they leave the conveyor, means on the conveyor mounting the roller for rotation to aid in carrying down trash such as sticks and sod that drop between the conveyor and the roller, said means being yieldable away from the conveyor to accommodate thick pieces of sod, etc., and a scraper carried by said mounting means beneath the roller for clearing the roller of trash.

9. In a potato harvester, the combination with an endless conveyor composed of a multiplicity of cross rods linked together at their ends on which the potatoes are carried, of a sloping plate between the upper and lower flights of said conveyor at its discharge end, said plate having its topmost edge substantially in contact with the rods of the top flight at said discharge end and receding from the rods of the top flight as it extends away from said discharge end whereby to lift sticks, small potatoes, etc. between said rods as they approach the discharge end, a freely rotatable transverse roller positioned in proximity to the downwardly moving rods at the discharge end of the conveyor, means on the conveyor mounting said roller for free rotation to aid in carrying down trash such as sticks and sod that drop between the conveyor and the roller, said means being yieldable away from the conveyor to accommodate thick pieces of sod, etc., and a scraper carried by said mounting means adjacent the roller for clearing the roller of trash.

References Cited in the file of this patent

UNITED STATES PATENTS

| | | |
|---|---|---|
| 1,097,439 | Jaquette | May 19, 1914 |
| 1,199,704 | Kendall | Sept. 26, 1916 |
| 1,715,218 | Wright et al. | May 28, 1929 |
| 2,153,688 | Fitzgerald | Apr. 11, 1939 |
| 2,212,676 | Vosler | Aug. 27, 1940 |
| 2,365,077 | Hertzler | Dec. 12, 1944 |
| 2,391,412 | Gorton | Dec. 25, 1945 |
| 2,711,742 | Lavers | June 28, 1955 |